United States Patent [19]

Meisel, Jr.

[11] 4,149,757
[45] Apr. 17, 1979

[54] AUTOMATIC TRACK CHAIN TENSIONER

[75] Inventor: Thomas C. Meisel, Jr., Peoria, Ill.

[73] Assignee: Caterpillar Tractor Co., Peoria, Ill.

[21] Appl. No.: 762,906

[22] Filed: Jan. 27, 1977

[51] Int. Cl.² .................................................. B62D 55/30
[52] U.S. Cl. .................................................. 305/10; 305/31
[58] Field of Search .............................. 305/10, 31, 32

[56] References Cited

U.S. PATENT DOCUMENTS

| 3,787,097 | 1/1974 | Orr | 305/10 |
| 3,972,569 | 8/1976 | Bricknell | 305/10 |

*Primary Examiner*—John P. Shannon

*Attorney, Agent, or Firm*—Phillips, Moore, Weissenberger, Lempio & Majestic

[57] ABSTRACT

A tensioning and recoil apparatus for the idler wheel and track of a crawler-type vehicle, such apparatus including a recoil spring and a hydraulic cylinder interposed between the spring and idler wheel. Hydraulic fluid is added to or released from the cylinder, as needed, to maintain a predetermined pressure level in the cylinder and a constant tension in the track trained around the idler and to provide a fluid damping of peak loads on the idler wheel and track during forward drive. Fluid is trapped in the cylinder when in reverse drive so that the cylinder then functions as a solid link between the recoil spring and idler wheel.

12 Claims, 2 Drawing Figures

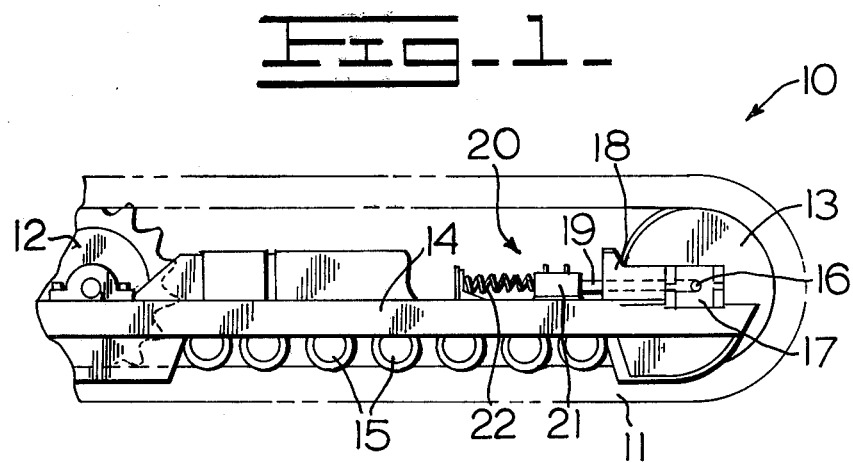
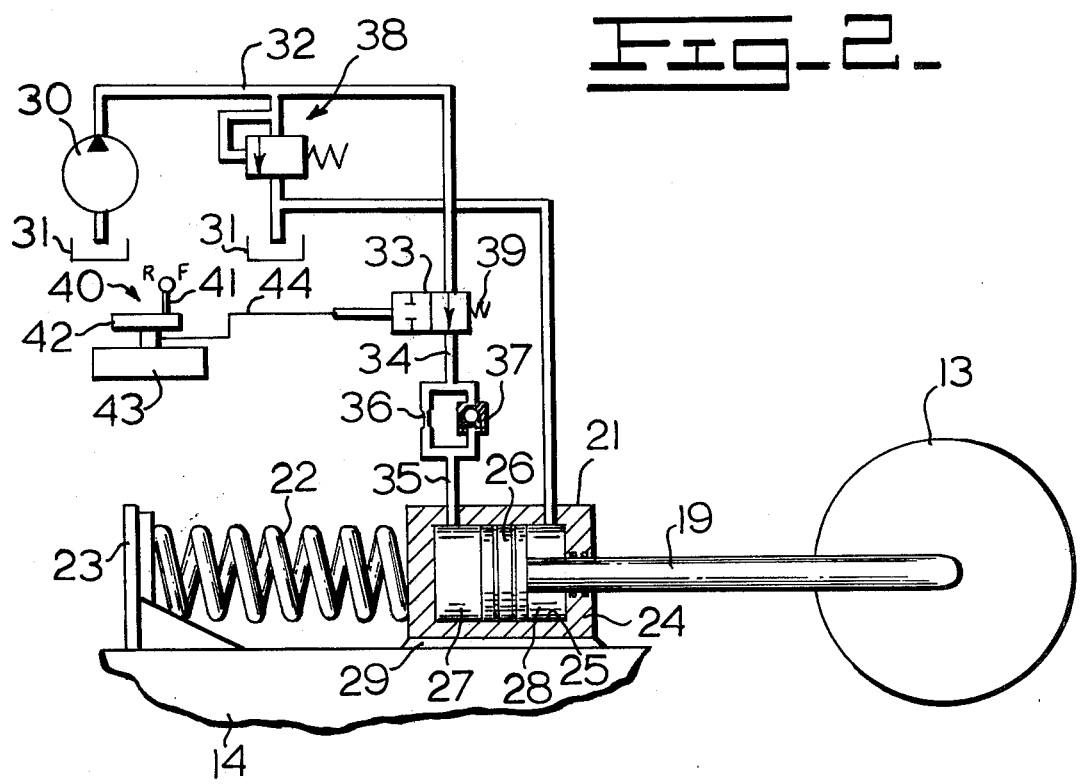

AUTOMATIC TRACK CHAIN TENSIONER

BACKGROUND OF THE INVENTION

The present invention relates to track chain tensioning devices and pertains particularly to an automatic track chain adjusting system.

The under carriage and endless track of track-type vehicles is normally subjected to fairly rapid wear because of the harsh environment in which such vehicles normally operate. It has been found that proper adjustment or tension in the track of such vehicles can enhance the life of the track assembly as well as the performance of the vehicle. This constant wear of the track chain results in undue slack in the track chain which further increases the rate of wear of the track assembly.

The maintenance of proper tension in such track assemblies is difficult under field conditions and normally requires experienced maintenance personnel with proper tools.

Track chain wear is also rapidly increased whenever the tension is also improperly increased. Dirt and mud which occasionally accumulate on the track will quickly increase the tension of a properly adjusted, clean chain assembly. A properly adjusted track appears "too loose" to most operators who frequently over-tighten the track for this reason. This also results in increased wear of the track.

Another problem encountered with these track-type vehicles is the occasional passage of relatively large unbreakable foreign objects such as rocks and the like between the track chain and the drive sprocket or idler. Such passage of objects can result in the breakage of the chain or other elements of the system if the recoil mechanism of the system cannot accommodate the object.

These forces and the passage of large objects between the track and idler are accommodated by means of large recoil mechanisms using large coil springs. Numerous proposals have been made to overcome one or more of these problems with the prior art. These proposals include hydromechanical recoil and adjusting system which are disclosed, for example, in the following patents: U.S. Pat. No. 3,647,270, issued Mar. 7, 1972 to Althaus; U.S. Pat. No. 3,733,107, issued May 15, 1973 to Cote et al; and, U.S. Pat. No. 3,901,563, issued Aug. 26, 1975 to Day.

SUMMARY OF THE INVENTION

In accordance with the present invention an idler wheel for an endless track of a track-type vehicle is provided with a recoil and adjusting mechanism wherein the adjusting mechanism includes a cylinder assembly disposed between a large recoil spring and the idler wheel with a source of hydraulic pressure at a predetermined pressure communicated continuously to the hydrualic cylinder during forward drive of the vehicle and including valve means responsive to reverse of the vehicle to establish a hydraulic lock of the cylinder assembly during reverse of the vehicle.

It is the primary object of this invention to overcome the above problems of the prior art by providing an automatic tensioning means for the track of a track-type vehicle.

Another object of the present invention is to provide an automatic hydro-mechanical tensioning and recoil mechanism for the endless track of the track-laying vehicle which is responsive to the forward drive of the vehicle to maintain a constant tension in the track and responsive to reverse of the vehicle to establish a hydraulic lock between the idler wheel and the recoil mechanism.

BRIEF DESCRIPTION OF THE DRAWINGS

The above and other objects and advantages of the present invention will become apparent from the following description when read in conjunction with the drawings, wherein:

FIG. 1 is an elevational view of an under carriage of a vehicle in accordance with the present invention; and FIG. 2 is a schematic layout of a tensioning and recoil mechanism in accordance with the present invention.

DETAILED DESCRIPTION OF THE PREFERRED EMBODIMENT

Turning now to FIG. 1 there is illustrated an undercarriage generally designated by the numeral 10 of a track-type vehicle not shown, and including an endless track or chain 11 trained about a drive sprocket 12 and an idler wheel 13, both mounted on opposite ends respectively of a pair of rails or frame 14. A plurality of support rollers 15 are mounted to the rails or frame 14 and ride on the groundengaging portion of the track 11. The usual arrangement of the undercarriage is such that the idler wheel 13 is at the forward end of the vehicle so that with power introduced into the drive sprocket 12 from the engine, the sprocket 12 rolls along the lower or ground-engaging portion of the track 11 as the track is laid down on the ground surface by or in front of the sprocket by the idler wheel 13. Thus, in a forward direction in lower portion of the track 11 more particularly that portion which engages the ground and supports the vehicle is in tension.

It will be appreciated then that when the vehicle is placed in reverse drive, the sprocket 12 drives in a reverse direction, thus pulling the upper portion of the chain toward the sprocket 12 applying tension therein which tension is transmitted throughout the chain across idler wheel 13 and to the portion of the track which is resting on the surface of the ground and on which the vehicle is resting. It will thus be appreciated that the force necessary to move the vehicle in reverse direction is transmitted through the chain or track in this manner and is applied to the chain and to the idler wheel 13. For this reason, a great deal of force must be accommodated in the recoil mechanism which supports the idler wheel 13.

The idler wheel 13 is supported by means of a shaft and suitable journal means 17 which are slidably mounted on rail or frame 14. The journal means 17 is connected to a yoke assembly including yoke means 18 having a shaft or rod 19 connected to a tension-adjusting assembly indicated generally at 20 and including a hydraulic cylinder 21 which is connected to the shaft 19 on one side and is biased by means of a recoil spring 22 toward the idler pulley or wheel 13. On end 22a of recoil spring 22 constitutes a movable force-absorbing end and engages one end of the hydrualic cylinder assembly 21 and the opposite end 22b is fixed by means of bracket means 23 secured to rail means 14. The term "hydraulic cylinder" as used herein refers to the combination of a piston and cylinder assembly of the well known type which is responsive to hydraulic fluid for extension and retraction and which has first and second members arranged for movement relative to each other for such extension and retraction. The hydraulic cylinder of the present invention includes a housing an end wall member 24a coupled to the force-absorbing end of recoil spring 22. Housing 24 also has 24 having a cylindrical bore 25 in which is reciprocably disposed a piston member 26 the latter being coupled to the end of the force transmitting rod 19 of yoke 18. This piston 26 divides the cylindrical bore 25 within the housing into first and second chambers 27 and 28 respectively. Fluid is introduced into chamber 27 to extend the piston and to force the idler wheel 13 outwardly. The fluid is drained from chamber 27 to permit retraction of the piston 26 and movement of the idler wheel 13 backward toward the recoil spring 22.

The housing 24 is slidably mounted on rail 14 by suitable slide or guide means 29 and is thus movable on the rail means toward the idler wheel 13 and toward the stop 23.

Cooperating with the just-described hydraulic piston and cylinder assembly is a control system which cooperates therewith to constitute an automatic tensioning system. This system comprises a continuous source of fluid at a predetermined pressure comprising a pump 30 which draws fluid from a suitable reservoir 31 and supplies it by way of supply line 32 and by way of a control valve 33 to conduit means 34 which communicates with an inlet 35 to the chamber 27 of the hydraulic cylinder 21. Fluid restricting means 36 such as an orifice or the like and check valve means 37 are disposed in parallel in the supply conduit 34. It will be noted that the check valve 37 permits unrestricted flow of fluid to the inlet port 35 to chamber 27 but blocks return fluid by that branch line. The restricting means 36 permits restricted flow in a return direction from the chamber 27 by way of restriction 36, valve 33 and conduit 35 back to a relief valve assembly 38 for return to the sump or tank 31. It will, of course, be appreciated that this return of fluid can be accomplished when the pressure in chamber 27 exceeds the relief setting of valve 38 to permit back flow against the pressure from pump 30. This can also occur only when the valve 33 is in the open position as shown. Such excessive pressure in the chamber 27 could occur, for example, when rocks or similar objects become lodged between the track 11 and idler wheel 13 and force the wheel 13 to the left increasing the tension in spring 22 to such an extent to simultaneously increase the pressure in chamber 27 to the relief valve setting.

The valve 33, as indicated, is a pressure-responsive, two-position valve normally biased by suitable spring means 39 to a open position for open communication between pump 30 and the chamber 27 and in this embodiment is responsive to a signal from transmission control means 40 to be shifted to a blocking position to block communication of fluid between chamber 27 and the pump 30 or the relief valve 38. This blocking position results in a hydraulic lock being developed in the hydraulic cylinder 21, thereby establishing a rigid link between the idler wheel 13 and the spring 22. This is accomplished when the vehicle is placed in reverse condition. This function is important because, in general, the proper track tension during forward operation of the vehicle (provided by the cylinder apparatus) is too small for reverse operation of the vehicle, and if such blocking did not occur, the cylinder would be undesirably, forcibly retracted during such reverse operation. In the present embodiment a control lever 41 for establishing forward and reverse of the vehicle is connected to suitable valve means 42 for controlling a transmission 43 of the vehicle. When the lever 41 is shifted to the reverse position to place the vehicle in reverse drive, a signal from the transmission control sends a pressure signal by way of line 44 to the valve 33 for shifting it to the block position.

What is claimed is:

1. An adjusting and recoil apparatus comprising:
   (a) a spring having a fixed end and a movable force-absorbing end,
   (b) a movable force-transmitting member spaced from said spring,
   (c) a fluid cylinder having first and second members operatively arranged for movement relative to each other for extension and retraction of said cylinder, one of said members being coupled to said force-absorbing end of said spring and the other of said members coupled to said force-transmitting member,
   (d) pressure-maintaining means for maintaining a substantially constant predetermined fluid pressure level in said cylinder by the admission of hydraulic fluid under pressure into said cylinder when the fluid pressure therein is below said predetermined pressure level and by the release of hydraulic fluid therefrom when the fluid pressure in said cylinder is at any pressure above said predetermined pressure level.

2. An adjusting and recoil apparatus comprising:
   (a) a spring having a fixed end and a movable force-absorbing end,
   (b) a movable force-transmitting member spaced from said spring,
   (c) a fluid cylinder having first and second members operatively arranged for movement relative to each other for extension and retraction of said cylinder, one of said members being coupled to said force-absorbing end of said spring and the other of said members coupled to said force-transmitting member,
   (d) pressure-maintaining means for maintaining a substantially constant predetermined fluid pressure level in said cylinder by the admission of hydraulic fluid under pressure into said cylinder when the fluid pressure therein is below said predetermined pressure level and by the release of hydraulic fluid therefrom when the fluid pressure in said cylinder is above said predetermined pressure level, and
   (e) wherein said pressure-maintaining means includes a conduit through which fluid must flow when released from said cylinder and also includes flow restrictor means having a continually open orifice in said conduit for restricting the rate of flow of fluid therethrough.

3. Apparatus as set forth in claim 2 and further including:
   (f) means for selectively:
      (1) allowing said pressure maintaining means to release hydraulic fluid from said cylinder when the fluid pressure therein is above said predetermined pressure level;
      (2) preventing said pressure maintaining means from releasing hydraulic fluid from said cylinder even though the fluid pressure therein is above said predetermined pressure level.

4. Apparatus as set forth in claim 2 and further including:
   a valve in said conduit for selectively allowing or preventing fluid flow through said conduit.

5. Apparatus as set forth in claim 2 wherein said pressure-maintaining means includes means for enabling fluid to flow to said cylinder at a greater rate than fluid can flow when released therefrom.

6. Apparatus as set forth in claim 2 wherein said pressure-maintaining means includes a first conduit check valve means in said first conduit for allowing unrestricted flow of fluid through said first conduit to said cylinder and for preventing release of fluid from said cylinder through said first conduit, a second conduit for allowing fluid released from said cylinder to flow therethrough, and said open orifice restricts the rate of flow of fluid through said second conduit to less than the rate of flow of fluid through said first conduit.

7. An adjusting and recoil apparatus comprising:
   (a) a spring having a fixed end and a movable force-absorbing end,
   (b) a movable force-transmitting member spaced from said spring,
   (c) a fluid cylinder having first and second members operatively arranged for movement relative to each other for extension and retraction of said cylinder, one of said members being coupled to said force-absorbing end of said spring and the other of said members coupled to said force-transmitting member,
   (d) pressure-maintaining means for maintaining a substantially constant predetermined fluid pressure level in said cylinder by the admission of hydraulic fluid under pressure into said cylinder when the fluid pressure therein is below said predetermined pressure level and by the release of hydraulic fluid therefrom when the fluid pressure in said cylinder is above said predetermined pressure level, and
   (e) wherein said pressure-maintaining means includes a first conduit check valve means in said first conduit for allowing unrestricted flow of fluid through said first conduit to said cylinder and for preventing release of fluid from said cylinder through said first conduit, a second conduit for allowing fluid released from said cylinder to flow therethrough, and means for restricting the rate of flow of fluid through said second conduit to less than the rate of flow of fluid through said first conduit,
   and further including:
     a valve for selectively allowing or preventing fluid flow through said second conduit.

8. An adjusting and recoil apparatus comprising:
   (a) a spring having a fixed end and a movable force-absorbing end,
   (b) a movable force-transmitting member spaced from said spring,
   (c) a fluid cylinder having first and second members operatively arranged for movement relative to each other for extension and retraction of said cylinder, one of said members being coupled to said force-absorbing end of said spring and the other of said members coupled to said force-transmitting member,
   (d) pressure-maintaining means for maintaining a substantially constant predetermined fluid pressure level in said cylinder by the admission of hydraulic fluid under pressure into said cylinder when the fluid pressure therein is below said predetermined pressure level and by the release of hydraulic fluid therefrom when the fluid pressure in said cylinder is above said predetermined pressure level, and
   (e) wherein said pressure-maintaining means includes a first conduit, check valve means in said first conduit for allowing unrestricted flow of fluid through said first conduit to said cylinder and for preventing release of fluid from said cylinder through said first conduit, a second conduit for allowing fluid released from said cylinder to flow therethrough, and means for restricting the rate of flow of fluid through said second conduit to less than the rate of flow of fluid through said first conduit,
   and further including:
     a valve for selectively allowing or preventing fluid flow through both of said first and second conduits.

9. In a track chain system having a frame, a drive wheel rotatably mounted on said frame, an idler wheel spaced from said drive wheel, a yoke rotatably supporting said idler wheel, means mounting said yoke on said frame for movement towards and away from said drive wheel, and an endless track trained around said drive and idler wheels, a chain-tensioning system comprising:
   a recoil spring having one end fixed to said frame and having a movable force-absorbing end,
   a fluid cylinder having first and second members operatively arranged for movement relative to each other for extension and retraction of said cylinder, one of said means being coupled to said force-absorbing end of said spring and the other member being coupled to said yoke,
   pressure-maintaining means for maintaining a substantially constant predetermined pressure level in said cylinder by the admission of hydraulic fluid under pressure into said cyliner when the fluid pressure therein is below said predetermined pressure level and by the release of hydraulic fluid therefrom when the fluid pressure in said cylinder is at any pressure above said predetermined pressure level.

10. In a track chain system having a frame, a drive wheel rotatably mounted on said frame, an idler wheel spaced from said drive wheel, a yoke rotatably supporting said idler wheel, means mounting said yoke on said frame for movement towards and away from said drive wheel, and an endless track trained around said drive and idler wheels, a chain-tensioning system comprising:
   a recoil spring having one end fixed to said frame and having a movable force-absorbing end,
   a fluid cylinder having first and second members operatively arranged for movement relative to each other for extension and retraction of said cylinder, one of said members being coupled to said force-absorbing end of said spring and the other member being coupled to said yoke,
   pressure-maintaining means for maintaining a substantially constant predetermined pressure level in said cylinder by the admission of hydraulic fluid under pressure into said cylinder when the fluid pressure therein is below said predetermined pressure level and by the release of hydraulic fluid therefrom when the fluid pressure in said cylinder is at any pressure above said predetermined pressure level; and
   wherein said pressure maintaining means includes a conduit through which fluid must flow when released from said cylinder, said system further including: a valve in said conduit,
   direction control means for controlling the direction of drive of said endless track, means for opening said valve during drive of said track in one direction and for closing said valve during drive of said track in the other direction so there is no cylinder pressure relief.

11. The chain-tensioning system of claim 10 wherein said pressure-maintaining means includes a first conduit, check valve means in said first conduit means for allowing flow of fluid through said first conduit to said cylinder and for preventing release of fluid from said cylinder through said first conduit, a second conduit for allowing fluid released from said cylinder to flow therethrough, and means including an orifice for restricting the rate of flow of fluid through said second conduit to less than the rate of flow of fluid through said first conduit.

12. In a track chain system having a frame, a drive wheel rotatably mounted on said frame, an idler wheel spaced from said drive wheel, a yoke rotatably supporting said idler wheel, means mounting said yoke on said frame for movement towards and away from said drive wheel, and an endless track trained around said drive and idler wheels, a chain-tensioning system comprising:

a recoil spring having one end fixed to said frame and having a movable force-absorbing end, a fluid cylinder having first and second members operatively arranged for movement relative to each other for extension and retraction of said cylinder, one of said members being coupled to said force-absorbing end of said spring and the other member being coupled to said yoke, pressure-maintaining means for maintaining a substantially constant predetermined pressure level in said cylinder by the admission of hydraulic fluid under pressure into said cylinder when the fluid pressure therein is below said predetermined pressure level and by the release of hydraulic fluid therefrom when the fluid pressure in said cylinder is above said predetermined pressure level, and wherein said pressure-maintaining means includes a first conduit, check valve means in said first conduit for allowing flow of fluid through said first conduit to said cylinder and for preventing release of fluid from said cylinder through said first conduit, a second conduit for allowing fluid released from said cylinder to flow therethrough, and means for restricting the rate of flow of fluid through said second conduit to less than the rate of flow of fluid through said first conduit, further including:

control valve means for selectively allowing or preventing fluid flow through said second conduit, directional control means for controlling the direction of drive of said endless track, means for opening said control valve during drive of said track in one direction and for closing said control valve during drive of said track in the other direction.

* * * * *